United States Patent
Sasadai

(10) Patent No.: US 10,735,565 B2
(45) Date of Patent: Aug. 4, 2020

(54) ELECTRONIC APPARATUS AND RECORDING MEDIUM SUITABLE FOR CONNECTION WITH WIRELESS LAN (LOCAL AREA NETWORK) AND WIRED LAN

(71) Applicant: KYOCERA Document Solutions Inc., Osaka (JP)

(72) Inventor: Koji Sasadai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/223,601

(22) Filed: Dec. 18, 2018

(65) Prior Publication Data

US 2019/0191018 A1 Jun. 20, 2019

(30) Foreign Application Priority Data

Dec. 18, 2017 (JP) ................. 2017-242160

(51) Int. Cl.
*H04L 29/06* (2006.01)
*H04L 12/46* (2006.01)

(52) U.S. Cl.
CPC .............. *H04L 69/24* (2013.01); *H04L 12/46* (2013.01); *H04L 12/4625* (2013.01)

(58) Field of Classification Search
CPC ..... H04L 69/24; H04L 12/4625; H04L 12/46; H04L 69/18
See application file for complete search history.

(56) References Cited

U.S. PATENT DOCUMENTS

| 8,503,340 | B1* | 8/2013 | Xu | H04W 84/12 370/310 |
| 2007/0162634 | A1* | 7/2007 | Okazaki | G06F 13/387 710/15 |
| 2012/0106343 | A1* | 5/2012 | Lee | H04L 69/14 370/235 |

FOREIGN PATENT DOCUMENTS

JP H09-116594 A 5/1997

* cited by examiner

*Primary Examiner* — Mohammad S Anwar
(74) *Attorney, Agent, or Firm* — Hawaii Patent Services; Nathaniel K. Fedde; Kenton N. Fedde

(57) ABSTRACT

Provided is an electronic apparatus capable of saving power. A wired LAN I/F control unit sets a connection standard (first connection standard) of a wired LAN I/F. A wireless LAN I/F control unit sets a connection standard (second connection standard) of a wireless LAN I/F. A connection-speed-management unit confirms a data transmission rate (first transmission rate) of a wired LAN and a data transmission rate (second transmission rate) of a wireless LAN. A system-control unit, when as a confirmation result by the connection-speed-management unit the transmission rate (first transmission rate) is higher than the transmission rate (second transmission rate), instructs the wired LAN I/F control unit to set the connection standard (first connection standard) having the low transmission rate (first transmission rate).

6 Claims, 4 Drawing Sheets

ELECTRONIC APPARATUS AND RECORDING MEDIUM SUITABLE FOR CONNECTION WITH WIRELESS LAN (LOCAL AREA NETWORK) AND WIRED LAN

INCORPORATION BY REFERENCE

This application is based on and claims the benefit of priority from Japanese Patent Application No. 2017-242160 filed on Dec. 18, 2017, the contents of which are hereby incorporated by reference.

BACKGROUND

The present disclosure relates to an electronic apparatus and a recording medium suitable for connecting to a wireless LAN (Local Area Network) and a wired LAN.

For example, in an environment in which a wired LAN network is constructed, there are cases in which a wireless LAN network is connected. Incidentally, in a wired LAN network, it is possible to exchange data stably by connecting a desktop personal computer, an image forming apparatus such as MFP (Multifunction Peripheral), and the like having a communication function. On the other hand, in a wireless LAN network, data can be exchanged regardless of the location by connecting a portable terminal such as a smartphone, a notebook computer, a tablet type terminal or the like. Note that when the transmission rate in a wired LAN is different from the transmission rate in a wireless LAN, the connection standard of the interface may be changed depending on the case.

In typical technology, as an apparatus related to this kind of change in the connection standard of an interface, there is a relay apparatus. A detection method detects the transmission rate of a network. A confirmation method confirms whether the transmission rate of the network matches the transmission rate of the interface. A timer repeatedly starts a confirmation process at specific time intervals. In the case where a result of confirmation is that there is no match, a method of change changes the transmission rate of the interface according to the transmission rate of the network.

SUMMARY

The electronic apparatus according to the present disclosure includes a wired LAN I/F control unit, a wireless LAN I/F control unit, a connection-speed-management unit, and a system-control unit. The wired LAN I/F control unit sets a first connection standard of a wired LAN I/F. The wireless LAN I/F control unit sets a second connection standard of a wireless LAN I/F. The connection-speed-management unit confirms a first transmission rate of data on a wired LAN and a second transmission rate of data on a wireless LAN. The system-control unit, when as a confirmation result by the connection-speed-management unit the first transmission rate is higher than the second transmission rate, instructs the wired LAN I/F control unit to set the first connection standard having the low first transmission rate.

The recording medium according to the present disclosure is a non-transitory computer-readable recording medium for storing a communication-setting program executable by a computer that controls an electronic apparatus. The computer, when executing the communication-setting program, by a wired LAN I/F control unit, sets a first connection standard of a wired LAN I/F. The computer, by a wireless LAN I/F control unit, sets a second connection standard of a wireless LAN I/F. The computer, by a connection-speed-management unit, confirms a first transmission rate of data on a wired LAN and a second transmission rate of data on a wireless LAN. The computer, by a system-control unit, when as a confirmation result by the connection-speed-management unit the first transmission rate is higher than the second transmission rate, instructs the wired LAN I/F control unit to set the first connection standard having the low first transmission rate.

DETAILED DESCRIPTION

In the following, an embodiment of an electronic apparatus according to the present disclosure will be described with reference to FIGS. 1 to 4. Incidentally, as an example of an electronic apparatus in the following description, a relay apparatus connecting a wired LAN (Local Area Network) and a wireless LAN is presumed.

Figure 1:
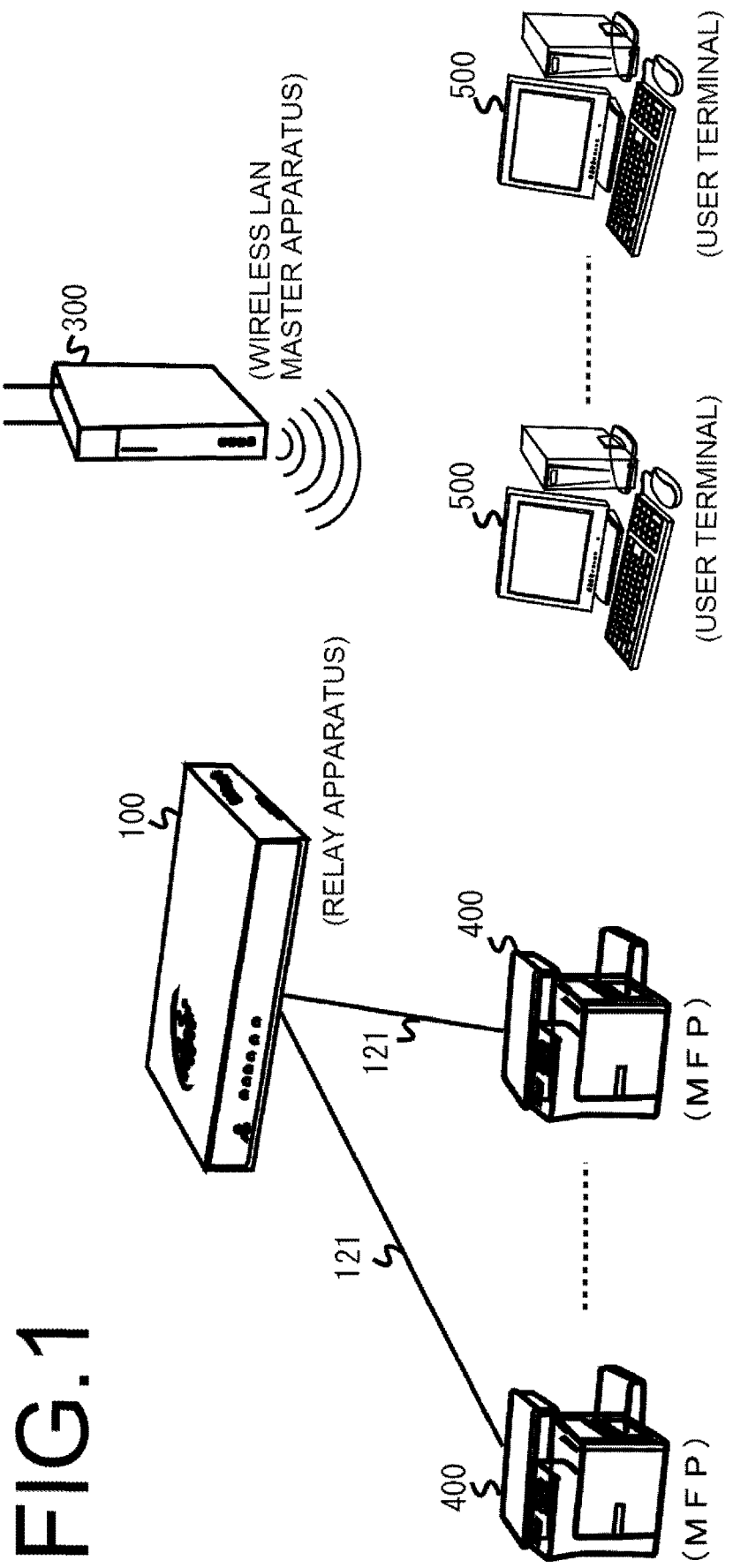
FIG. 1 is a diagram for describing an embodiment in the case where an electronic apparatus according to the present disclosure is applied to a relay apparatus.

First, as illustrated in FIG. 1, a relay apparatus 100 performs relay of data transmission and reception via a wireless LAN master apparatus 300. An MFP (Multifunction Peripheral) 400 having a printing function, a copying function, a FAX function, a scanner function, a data transmitting/receiving function via a network, and the like is connected to the relay apparatus 100 via a cable 121 constituting a wired LAN. In addition, the wireless LAN master apparatus 300 is connected to the relay apparatus 100 by a wireless LAN. A user terminal 500 is connected to the wireless LAN master apparatus 300 by a wireless LAN. Incidentally, the relay apparatus 100 is set so as to change the connection standard to a lower transmission rate when establishing a connection between a wired LAN and a wireless LAN, which will be described in detail later.

Figure 2:
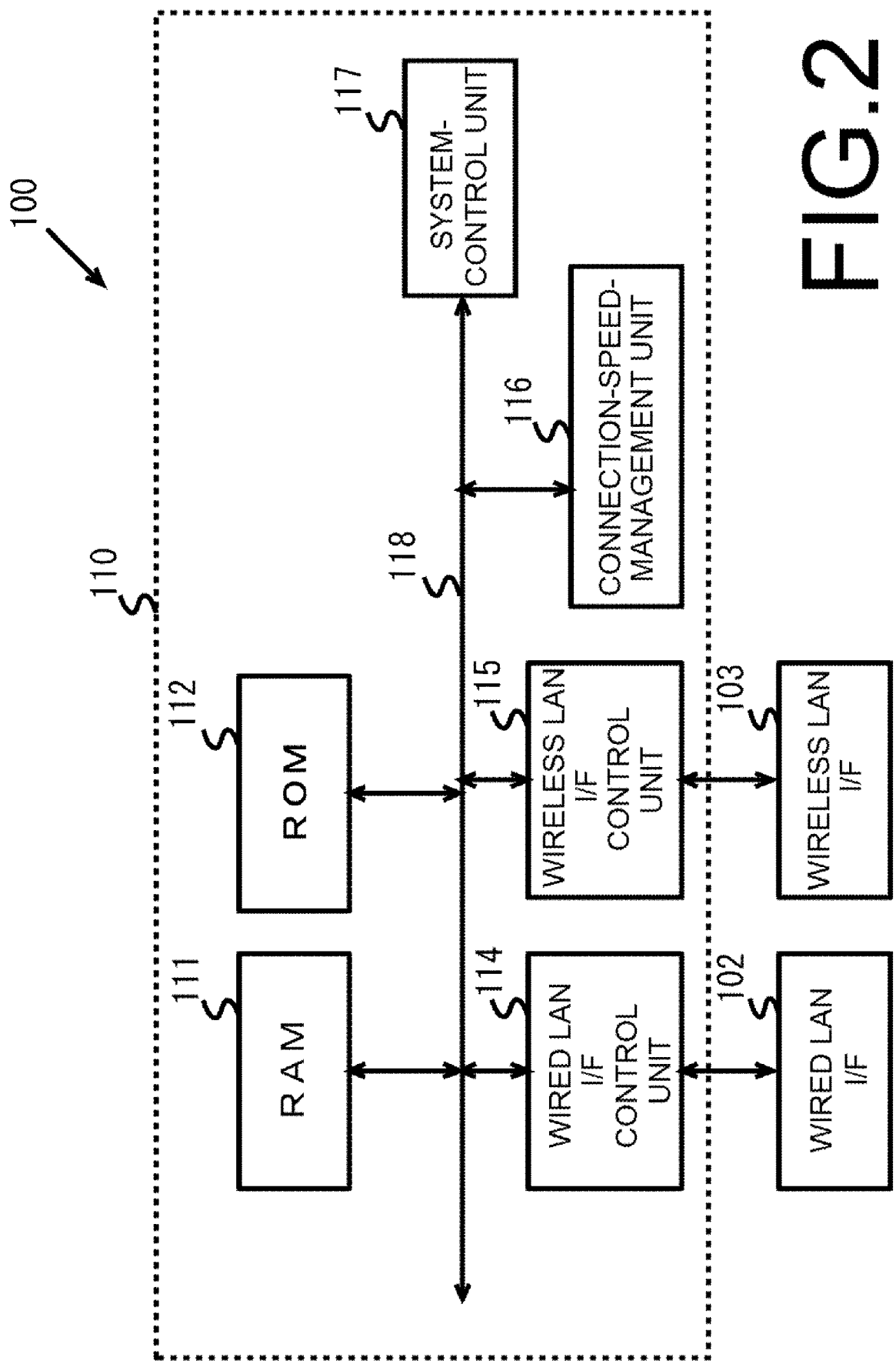
FIG. 2 is a diagram illustrating an example of configuration of the relay apparatus in FIG. 1.

Next, an example of the configuration of the relay apparatus 100 will be described with reference to FIG. 2. The relay apparatus 100 includes a control unit 110 that controls a wired LAN I/F (interface) 102 and a wireless LAN I/F (interface) 103. The wired LAN I/F 102 is in charge of communication with the MFP 400 via a cable 121. The wireless LAN I/F 103 is in charge of communication with the wireless LAN master apparatus 300 by a wireless LAN.

The control unit 110 is a processor that controls the operation of the entire relay apparatus 100 by executing application programs, control programs, and the like. The control unit 110 includes a RAM (random access memory) 111, a ROM (read only memory) 112, a wired LAN I/F control unit 114, a wireless LAN I/F control unit 115, a connection-speed-management unit 116, and a system-control unit 117. In addition, these units are connected to a data bus 118.

The RAM 111 is a work memory for executing programs. In the ROM 112, a control program for performing operation checks and the like of each unit is stored. The wired LAN I/F control unit 114 performs control of transmission and reception of data and the like with the MFP 400 via the wired LAN I/F 102. Note that the wired LAN I/F control unit 114 has, for example, 1000 BASE-T, 100 BASE-TX, and 10 BASE-T. 1000BASE-T is a connection standard in which the maximum data transfer rate (standard transmission rate) is 1 Gbps (=1000 Mbps). 100 BASE-TX is a connection standard in which the maximum data transfer rate is 100 Mbps. 10 BASE-TX is a connection standard in which the maximum data transfer rate is 10 Mbps. The connection standard of the wired LAN I/F 102 is determined in accordance with an instruction of the system-control unit 117.

The wireless LAN I/F control unit 115 performs control of transmission and reception of data and the like with the wireless LAN master apparatus 300 via the wireless LAN I/F 103. Note that the wireless LAN I/F control unit 115 includes, for example, the connection standards IEEE802.11n, IEEE802.11g, and IEEE802.11b. IEEE802.11n is a connection standard in which the maximum data transfer speed is 600 Mbps in the case where the frequency band is 2.4 GHz. IEEE 802.11 g is a connection standard in which the maximum data transfer speed is 54 Mbps. IEEE 802.11b is a connection standard in which the maximum data transfer speed is 11 Mbps. The connection standard of the wireless LAN I/F 103 is determined in accordance with an instruction of the system-control unit 117. Upon establishing a connection between a wired LAN and a wireless LAN, the connection-speed-management unit 116 confirms the transmission rate of the wired LAN and the transmission rate of the wireless LAN and notifies the system-control unit 117.

The system-control unit 117 controls cooperative operation and the like of each unit. In addition, the system-control unit 117 instructs the connection-speed-management unit 116 to confirm the transmission rate of the wired LAN and the transmission rate of the wireless LAN. This is at the time of activation of the relay apparatus 100, or when the MFP 400 and the wireless LAN master apparatus 300 are connected to the wired LAN I/F 102 or the wireless LAN I/F 103. In addition, the system-control unit 117 instructs the wired LAN I/F control unit 114 to change the connection standard to the connection standard with a lower transmission rate based on the confirmation result from the connection-speed-management unit 116. However, the system-control unit 117 does not instruct the wired LAN I/F control unit 114 to change to a connection standard in which the speed is lower than the maximum data transmission speed of the wireless LAN and in which the speed becomes the maximum data transfer speed of the wired LAN. In other words, the system-control unit 117 instructs the wired LAN I/F control unit 114 to change to the connection standard in which the maximum data transfer speed of the wired LAN is the slowest transfer speed on the condition that the speed is equal to or greater than the maximum data transmission speed of the wireless LAN. Incidentally, in this embodiment, it is presumed that the transmission rate of the wired LAN is higher than the transmission rate of the wireless LAN. Therefore, the system-control unit 117 instructs the wired LAN I/F control unit 114 to change the connection standard to the connection standard with a low transmission rate. More specifically, the connection-speed-management unit 116 confirms the actual data transmission rate of the wireless LAN and the actual data transmission rate of the wired LAN. Here, it is presumed that the connection-speed-management unit 116 confirms that the maximum data transfer speed of the wireless LAN is, for example, 54 Mbps, and confirms that the maximum data transfer speed of the wired LAN is, for example, 1 Gbps (=1000 Mbps). In this case, the wired LAN I/F control unit 114 invalidates the connection standard (1000BASE-T) in which the maximum data transfer speed is 1 Gbps (=1000 Mbps), and, for example, enables a connection standard (100 BASE-TX) in which the maximum data transfer speed becomes 100 Mbps. As a result, the wired LAN I/F 102 is in charge of communication with the MFP 400 via the cable 121 in the connection standard (100 BASE-TX) where the maximum data transfer speed is 100 Mbps.

Figure 3:
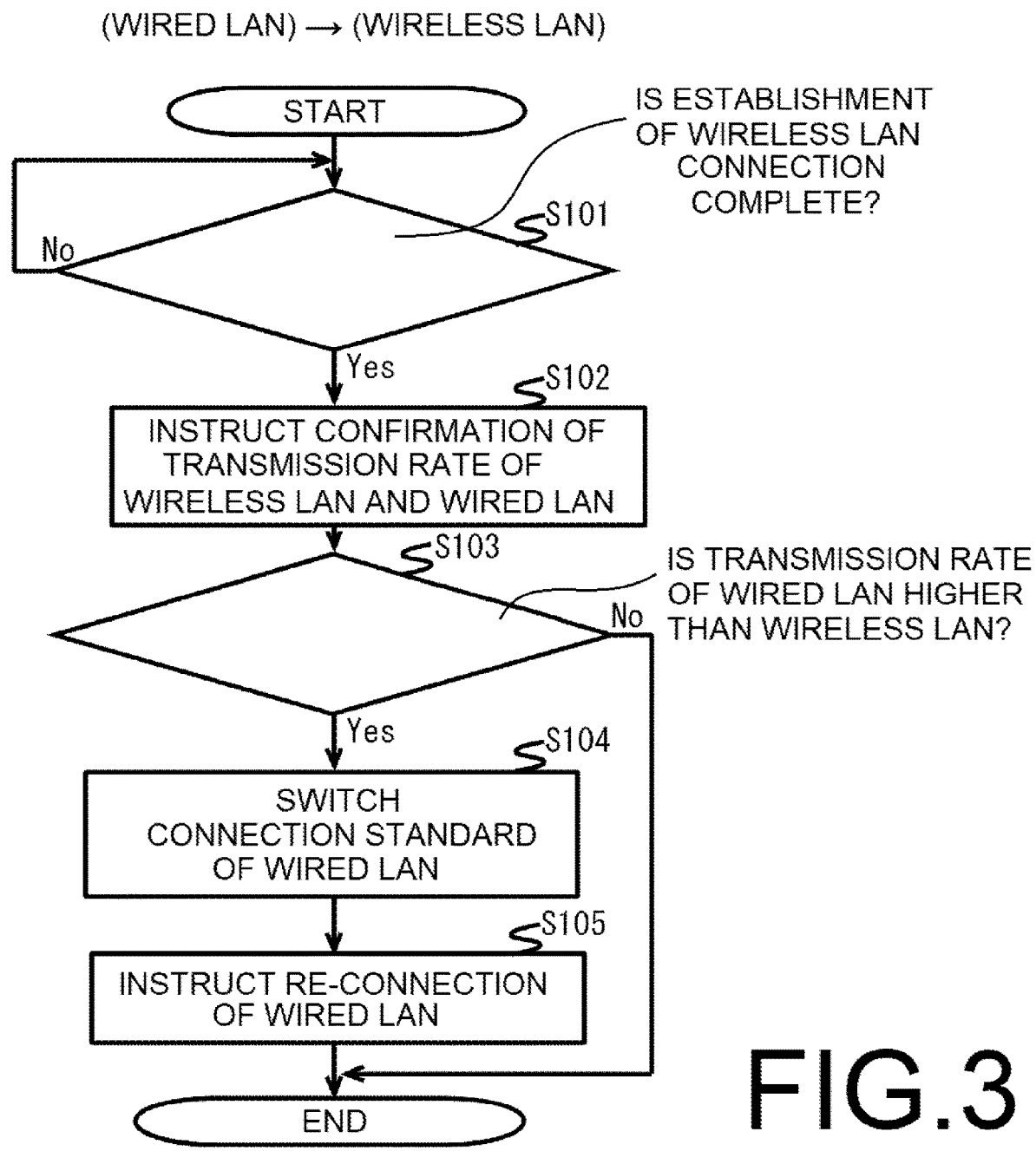
FIG. 3 is a flowchart for describing a communication setting process by the relay apparatus in FIG. 1 in the case of establishing a wireless LAN connection after establishing a wired LAN connection.

Next, the communication setting process in the relay apparatus 100 will be described with reference to FIG. 3. Incidentally, FIG. 3 illustrates a communication setting process in the case where a connection with the wireless LAN is established by the relay apparatus 100 after establishment of a connection with the wired LAN. Moreover, in the following description, it is presumed that the wired LAN I/F 102 is set to the connection standard (1000 BASE-T) at which the maximum data transfer speed of the wired LAN is 1 Gbps (=1000 Mbps), and a connection with a wired LAN has already been established.

(Step S101)

The system-control unit 117 determines whether or not establishment of a connection with a wireless LAN is completed.

In this case, when there is no notification from the wireless LAN I/F control unit 115 indicating that establishment of a connection is completed, the system-control unit 117 determines that establishment of a connection with a wireless LAN has not been completed (step S101: NO).

On the other hand, when there is a notification from the wireless LAN I/F control unit 115 indicating that establishment of a connection is completed, the system-control unit 117 determines that establishment of a connection with a wireless LAN has been completed (step S101: YES), and the process moves to step S102.

Incidentally, the wireless LAN I/F control unit 115 sets the transmission rate by negotiating with the wireless LAN master apparatus 300 via the wireless LAN I/F 103. Here, the most efficient transmission rate is selected according to the connection standard corresponding to the relay apparatus 400 and the wireless LAN master apparatus 300, and the communication environment between the relay apparatus 400 and the wireless LAN master apparatus 300. Then, when setting of the wireless LAN I/F 103 is completed, the wireless LAN I/F control unit 115 notifies the system-control unit 117 that establishment of a connection is completed.

(Step S102)

The system-control unit 117 instructs the connection-speed-management unit 116 to confirm the transmission rates of the wireless LAN and the wired LAN.

At this time, the connection-speed-management unit 116 confirms the actual data transmission rate on the wireless LAN side via the wireless LAN I/F control unit 115. In addition, the connection-speed-management unit 116 confirms the actual data transmission rate on the wired LAN side via the wired LAN I/F control unit 114. Then, the connection-speed-management unit 116 notifies the system-control unit 117 of the actual data transmission rate confirmed on the wireless LAN side and the wired LAN side.

(Step S103)

The system-control unit 117 determines whether the transmission rate of the wired LAN is higher than the transmission rate of the wireless LAN.

In this case, the system-control unit 117 determines that the transmission rate of the wired LAN is not higher than the transmission rate of the wireless LAN when, as the confirmation result by the connection-speed-management unit 116, the transmission rate of the wireless LAN is higher than the transmission rate of the wired LAN (Step S103: NO), and the process ends.

However, the system-control unit 117 determines that the transmission rate of the wired LAN is higher than the transmission rate of the wireless LAN when, as the confirmation result by the connection-speed-management unit 116, the transmission rate of the wired LAN is higher than the transmission rate of the wireless LAN (Step S103: YES). Then, the process moves to step S104.

(Step S104)

The system-control unit 117 confirms the connection standards of the wired LAN and the wireless LAN, and switches the connection standard of the wired LAN to a connection standard having a slow maximum transfer speed so that the maximum data transfer speed of the wired LAN does not fall below the maximum data transfer speed of the wireless LAN.

For example, in the case where the maximum data transfer speed of the wireless LAN is 54 Mbps (IEEE 802.11g) or 11 Mbps (IEEE 802.11b), the system-control unit 117 instructs the wired LAN I/F control unit 114 to invalidate the connection standard having a high transmission rate.

At this time, the wired LAN I/F control unit 114 invalidates the connection standard (1000 BASE-T) at which the maximum data transfer speed is 1 Gbps (=1000 Mbps), and, for example, enables the connection standard (100 BASE-TX) at which the maximum data transfer speed is 100 Mbps. As a result, the wired LAN I/F 102 is in charge of communication with the MFP 400 via the cable 121 in the connection standard (100 BASE-TX) where the maximum data transfer speed is 100 Mbps.

However, for example, in the case where the maximum data transfer speed of the wireless LAN is 600 Mbps (IEEE 802.11n), the system-control unit 117 does not instructs the wired LAN I/F control unit 114 to invalidate the connection standard having a high transmission rate.

(Step S105)

The system-control unit 117 instructs the wired LAN I/F control unit 114 to reconnect with the wired LAN.

At this time, the wired LAN I/F control unit 114, by negotiation with the MFP 400 via the wired LAN I/F 102, sets the transmission rate of the wired LAN I/F 102 to the connection standard (100 BASE-TX) where the maximum data transfer speed is 100 Mbps.

Incidentally, on the MFP 400 side, by negotiation with the relay apparatus 100, the connection standard (100 BASE-TX) in which the maximum data transfer speed is 100 Mbps is automatically set.

Next, the communication setting process in the case of establishing a connection with a wired LAN after the establishment of a wireless LAN connection will be described with reference to FIG. 4. Moreover, in the following description, similar to that described above, it is presumed that the wired LAN I/F 102 is set to the connection standard (1000 BASE-T) at which the maximum data transfer speed is 1 Gbps (=1000 Mbps), and a connection with a wireless LAN has already been established.

(Step S201)

The system-control unit 117 determines whether or not establishment of a connection with a wired LAN is completed.

In this case, when there is no notification from the wired LAN I/F control unit 114 indicating that establishment of a connection has been completed, the system-control unit 117 determines that establishment of a connection with a wired LAN has not been completed (step S201: NO).

However, when there is a notification from the wired LAN I/F control unit 114 indicating that establishment of a connection has been completed, the system-control unit 117 determines that establishment of a connection with a wired LAN has been completed (step S201: YES), and the process moves to step S202.

Incidentally, the wired LAN I/F control unit 114 sets the transmission rate by negotiating with the MFP 400 via the wired LAN I/F 102. At this time, when the maximum data transfer speed on the MFP 400 side is 1 Gbps (=1000 Mbps), the wired LAN I/F control unit 114 sets the wired LAN I/F 102 to the connection standard (1000 BASE-T) at which the maximum data transfer speed is 1 Gbps (=1000 Mbps). Then, after completion of setting of the wired LAN I/F 102, the wired LAN I/F control unit 114 notifies the system-control unit 117 that establishment of the connection is completed.

(Step S202)

The system-control unit 117 instructs the connection-speed-management unit 116 to confirm the transmission rates of the wired LAN and the wireless LAN.

At this time, the connection-speed-management unit 116 confirms the actual data transmission rate on the wired LAN side via the wired LAN I/F control unit 114. In addition, the connection-speed-management unit 116 confirms the actual data transmission rate on the wireless LAN side via the wireless LAN I/F control unit 115. Then, the connection-speed-management unit 116 notifies the system-control unit 117 of the actual data transmission rates confirmed on the wired LAN side and the wireless LAN side.

(Step S203)

The system-control unit 117 determines whether the transmission rate of the wired LAN is higher than the transmission rate of the wireless LAN.

In this case, the system-control unit 117 determines that the transmission rate of the wired LAN is not higher than the transmission rate of the wireless LAN when, as the confirmation result of the connection-speed-management unit 116, the transmission rate of the wireless LAN is higher than the transmission rate of the wired LAN (Step S203: NO), and the process ends.

However, the system-control unit 117 determines that the transmission rate of the wired LAN is higher than the transmission rate of the wireless LAN when, as the confirmation result of the connection-speed-management unit 116, the transmission rate of the wired LAN is higher than the transmission rate of the wireless LAN (Step S203: YES). Then, the process moves to step S204.

(Step S204)

The system-control unit 117 confirms the connection standards of the wired LAN and the wireless LAN, and switches the connection standard of the wired LAN to a connection standard having a slow maximum transfer speed so that the maximum data transfer speed of the wired LAN does not fall below the maximum data transfer speed of the wireless LAN.

For example, in the case where the maximum data transfer speed of the wireless LAN is 54 Mbps (IEEE 802.11g) or 11

Mbps (IEEE 802.11b), the system-control unit 117 instructs the wired LAN I/F control unit 114 to invalidate the connection standard with a high transmission rate.

At this time, the wired LAN I/F control unit 114 invalidates the connection standard (1000 BASE-T) at which the maximum data transfer speed is 1 Gbps (=1000 Mbps), and, for example, enables the connection standard (100 BASE-TX) at which the maximum data transfer speed is 100 Mbps. As a result, the wired LAN I/F 102 is in charge of communication with the MFP 400 via the cable 121 in the connection standard (100 BASE-TX) where the maximum data transfer speed is 100 Mbps.

However, for example, in the case where the maximum data transfer speed of the wireless LAN is 600 Mbps (IEEE 802.11n), the system-control unit 117 does not instruct the wired LAN I/F control unit 114 to invalidate the connection standard having a high transmission rate.

(Step S205)

The system-control unit 117 instructs the wired LAN I/F control unit 114 to reconnect with the wired LAN.

At this time, the wired LAN I/F control unit 114, by negotiation with the MFP 400 via the wired LAN I/F 102, sets the transmission rate of the wired LAN I/F 102 to the connection standard (100 BASE-TX) where the maximum data transfer speed is 100 Mbps.

Incidentally, on the MFP 400 side, by negotiation with the relay apparatus 100, the connection standard (100 BASE-TX) in which the maximum data transfer speed is 100 Mbps is automatically set.

In this way, in this embodiment, the wired LAN I/F control unit 114 sets the connection standard (first connection standard) of the wired LAN I/F 102, the wireless LAN I/F control unit 115 sets the connection standard (second connection standard) of the wireless LAN I/F, the connection-speed-management unit 116 confirms the data transmission rate of the wired LAN (first transmission rate) and the data transmission rate of the wireless LAN (second transmission rate), and when the confirmation result by the connection-speed-management unit 116 indicates that the transmission rate (first transmission rate) is higher than the transmission rate (second transmission rate), the system-control unit 117 instructs the wired LAN I/F control unit 114 to set the connection standard (first connection standard) having the low transmission rate (first transmission rate).

By setting the wired LAN I/F 102 to a connection standard (first connection standard) with a low transmission rate in this way, it is possible to dynamically change the transmission rate, so power saving can be achieved.

Figure 4:
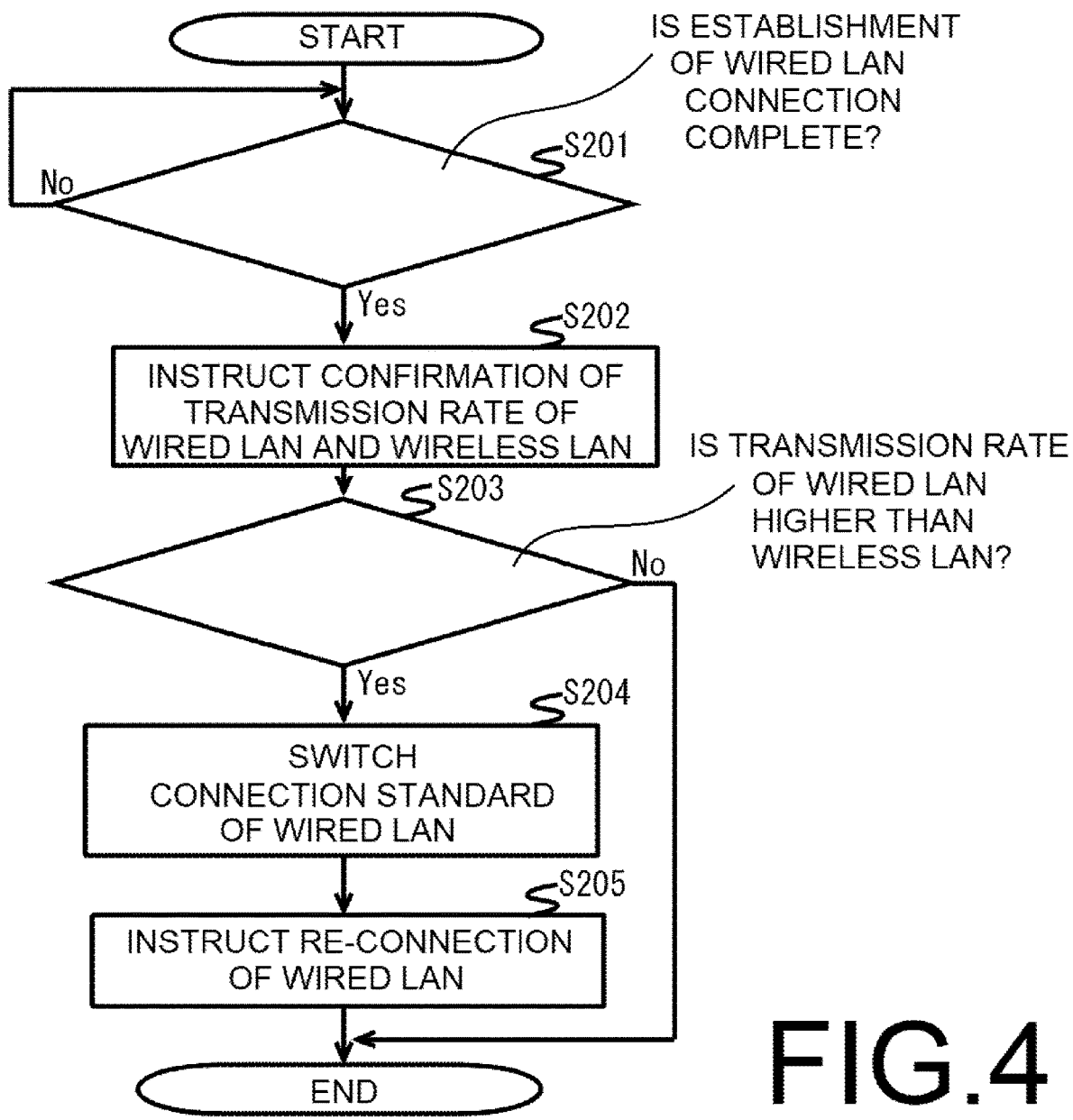
FIG. 4 is a flowchart for describing a communication setting process by the relay apparatus in FIG. 1 in the case of establishing a wired LAN connection after establishing a wireless LAN connection.

Incidentally, in the processing flow of FIGS. 3 and 4, confirmation (steps S102, S202) and comparison (steps S103, S203) of the actual transmission rates are performed, however, is also possible to perform confirmation and comparison of the maximum transmission speed of the connection standard (standard transmission rate) instead of the actual transmission rate.

In addition, in the above-described embodiment, the case where the frequency band corresponding to the connection standard of the wireless LAN is 2.4 GHz is described. However, even in the case where the relay 100 and the wireless LAN master apparatus 300 correspond to the connection standard of another frequency band (for example, 5 GHz) or correspond to the connection standard of a plurality of frequency bands, they can be similarly implemented.

In the relay device of the typical technique described above, in the case where the transmission rate of the network changes, the connection standard, which is the transmission rate of the interface, changes according to this change, so the transmission rate of the interface can be dynamically changed.

Incidentally, when attempting to link together a network based on the above-described wired LAN and a network based on the above-described wireless LAN, it is conceivable that an interface for connecting to a wired LAN and an interface for connecting to a wireless LAN may be provided in the relay apparatus. In this case, when the method of changing the transmission rate of a relay apparatus of typical technology is applicable, power saving becomes possible by changing the connection standard of the interface of the wired LAN or the wireless LAN to one with a lower transmission rate.

However, in a relay apparatus of the above-described typical technology, an interface that can be changed dynamically is limited to one that is connected to a single network. Therefore, in the case where the above-described interface for connecting to a wired LAN and the above-described interface for connecting to a wireless LAN are provided in a relay apparatus, it is not possible to change the connection standard for each interface.

For this reason, development of an apparatus capable of saving power by dynamically changing the respective connection standards for a plurality of interfaces is desired.

With the electronic apparatus and the recording medium according to the present disclosure, the transmission rate can be dynamically changed by setting a wired LAN I/F to a first connection standard with a low transmission rate, so power can be saved.

What is claimed is:

1. An electronic apparatus, comprising:
    a wired local area network ('LAN') I/F control unit for setting a first connection standard of a wired LAN interface ('I/F') from among a plurality of first connection standards;
    a wireless LAN I/F control unit for setting a second connection standard of a wireless LAN I/F;
    a connection-speed-management unit for confirming a first transmission rate of data on a wired LAN and a second transmission rate of data on a wireless LAN; and
    a system-control unit that, when as a confirmation result by the connection-speed-management unit, the first transmission rate is higher than the second transmission rate, avoids instructing the wired LAN I/F control unit to set a first connection standard, from among the plurality of first connection standards, that makes the first transmission rate lower than the second transmission rate, and instructs the wired LAN I/F control unit to set a first connection standard, from among the plurality of first connection standards, that results in a reduction of the first transmission rate, wherein the system-control unit, by said step of instructing and said step of avoiding instruction, configures the first transmission rate such that it is not lower than the second transmission rate.

2. The electronic apparatus according to claim 1, wherein the system-control unit, when as a confirmation result by the connection-speed-management unit, the first transmission rate is higher than the second transmission rate, instructs the wired LAN I/F control unit to invalidate a first connection standard of higher transmission rate, among the plurality of first connection standards, that is not lower than the second transmission rate.

3. The electronic apparatus according to claim 1, wherein the connection-speed-management unit confirms the first transmission rate and the second transmission rate when establishing a connection between the wired LAN and the wireless LAN.

4. The electronic apparatus according to claim 1, wherein the connection-speed-management unit confirms the first transmission rate and the second transmission rate based on an actual data transmission rate.

5. The electronic apparatus according to claim 1, wherein the connection-speed-management unit checks the first transmission rate and the second transmission rate based on a maximum transmission speed according to a connection standard.

6. A recording medium that is a non-transitory computer-readable recording medium for storing a communication-setting program executable by a computer that controls an electronic apparatus; and the computer, when executing the communication-setting program:

by a wired local area network ('LAN') interface ('I/F') control unit, sets a first connection standard of a wired LAN I/F;

by a wireless LAN I/F control unit, sets a second connection standard of a wireless LAN I/F;

by a connection-speed-management unit, confirms a first transmission rate of data on a wired LAN and a second transmission rate of data on a wireless LAN; and by a system-control unit, when as a confirmation result by the connection-speed-management unit the first transmission rate is higher than the second transmission rate, avoids instructing the wired LAN I/F control unit to set a first connection standard, from among the plurality of first connection standards, that makes the first transmission rate lower than the second transmission rate, and instructs the wired LAN I/F control unit to set a first connection standard, from among the plurality of first connection standards, that results in a reduction of the first transmission rate, wherein the system-control unit, by said step of instructing and said step of avoiding instruction, configures the first transmission rate such that it is not lower than the second transmission rate.

* * * * *